N. Hallock,

Fruit Basket.

No 2,441. Reissued Jan. 1, 1867.

N. PETERS, PHOTO-LITHOGRAPHER, WASHINGTON, D. C.

UNITED STATES PATENT OFFICE.

NICHOLAS HALLOCK, OF FLUSHING, NEW YORK.

IMPROVEMENT IN FRUIT-BOXES.

Specification forming part of Letters Patent No. 21,415, dated September 7, 1858; Reissue No. 2,441, dated January 1, 1867.

*To all whom it may concern:*

Be it known that I, NICHOLAS HALLOCK, of Flushing, in the county of Queens and State of New York, have invented a new and Improved Fruit-Box, for holding and packing for transportation all kinds of berries, &c.; and I do hereby declare the following to be a full, clear, and exact description thereof, reference being had to the accompanying drawings, figures, and letters of reference thereon, making part of this specification.

Figure 1:
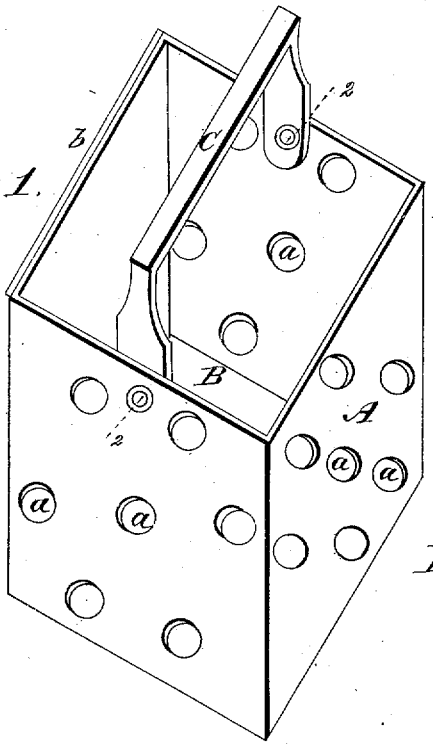
Figure 2:
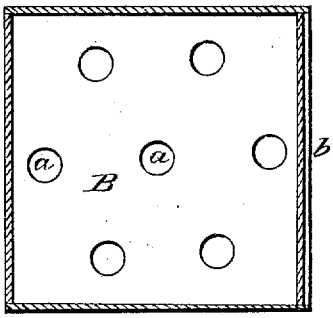
Figure 3:
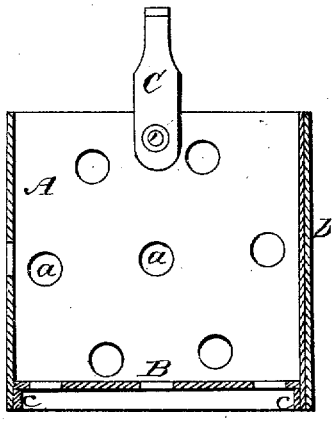

To the said drawings, Figure 1 is a perspective view of my improved box. Fig. 2 is a horizontal section. Fig. 3 is a vertical section.

Similar letters of reference indicate like parts in all of the drawings.

Prior to the date of my invention the ordinary manner of packing fruit was in small baskets, with but limited means of ventilation through the interstices caused by the interlacing of the strands forming the basket, which were wholly inadequate for the proper ventilation and preservation of the fruit packed therein for transportation to market. The basket-handle proved also a serious inconvenience in packing, the handle occupying nearly the same amount of room as the basket. These baskets were quite expensive, and their use materially advanced the price of berries, &c., the berries being sold in the baskets.

The object of my invention is to obviate all these objections, whereby I am enabled to make a fruit-box capable of proper ventilation for the preservation of fruit, adapting it so as to secure the greatest economy as to space or bulk, and to protect the fruit from injury when one box is placed upon another, and also to render them both strong and cheap, costing but a fraction of the cost of ordinary baskets.

To this end, and to enable others skilled in the art to make and use my invention, I will describe the construction of my box.

I take a thin strip of any ordinary wood, A, which has been steamed or soaked in water, and, by means of a knife or saw, cut a groove in the corners at *d*, which corners define the outline or shape of the box, and I then bend the strip A in the desired shape, and secure the sheet together at *b* by means of tacks or other fastenings.

B is the bottom of the box, which has been steamed, and the edges grooved at *d*, and the material bent at right angles, so as to be readily secured at *e* by tacking or otherwise, as shown in Fig. 3. My object in thus arranging and fastening the bottom is to strengthen the box and to leave sufficient space, so that when layers of the boxes are packed for transportation, the bottom of the box shall not rest upon or injure the contents of the one below it, and also to assist in ventilation. Upon three sides of the box and the bottom are perforations *a a*, sufficient in number and size to admit air for ventilation and preservation of the fruit. The handle C is secured to the sides of the box by means of eyelets 1 2, as shown, and is made of such dimensions as to fit and hold itself closely, within or around the body of the box, as may be desired. The doubled or lapped and fastened side of the box *b*, I have left without perforations, for marking the name of fruit-growers and their trade-marks thereon, which is usually done.

I claim—

1. A fruit-box constructed of thin sheets or strips of material, which form the body and bottom of the box, and are secured together, substantially as described and specified.

2. In combination with a box constructed of thin sheets or strips of material, substantially as described, so arranging the handle that it may be attached to and folded closely within the box, substantially as described and specified.

3. Defining the outline or shape of the box by means of grooves in the material forming the box, substantially as described and specified.

4. In fruit-boxes constructed substantially as described, making the bottom hollow, so that boxes may be placed one above the other without injury to the fruit in the one below it, and for better ventilation of the fruit, substantially as described and specified.

NICHOLAS HALLOCK.

Witnesses:

JAMES GORTON, Jr.,
C. A. DURGIN.